Patented July 9, 1929.

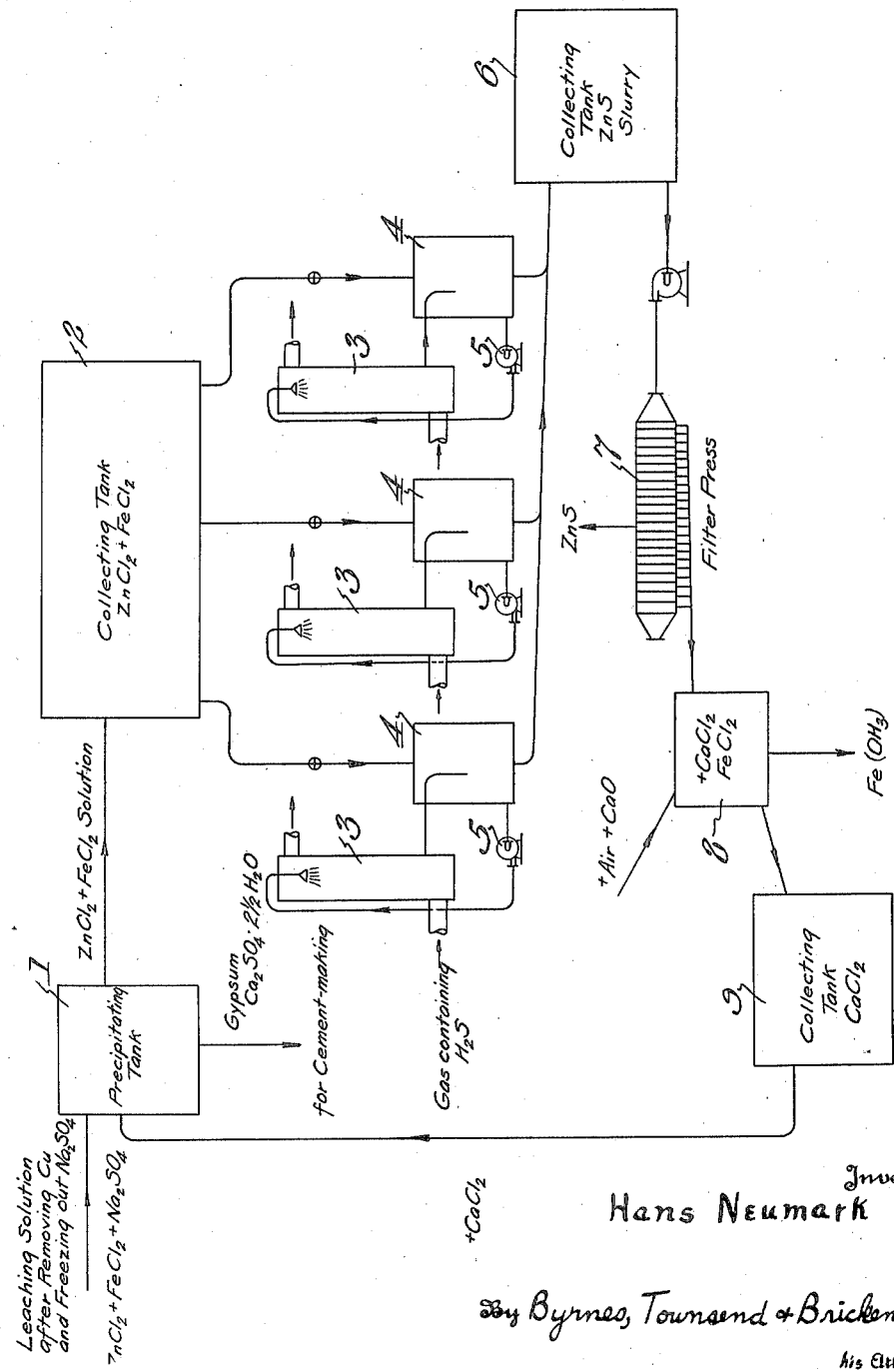

1,720,138

UNITED STATES PATENT OFFICE.

HANS NEUMARK, OF FRANKFORT-ON-THE-MAIN, GERMANY.

METHOD FOR WORKING UP SOLUTIONS OBTAINED BY LEACHING ORES HAVING BEEN SUBJECTED TO A CHLORINATION ROASTING PROCESS.

Application filed November 9, 1927, Serial No. 232,199, and in Germany November 20, 1926.

This invention relates to a method for working up solutions obtained by leaching ores having been subjected to a chloridizing roasting process.

It has already been proposed to recover copper and zinc from solutions obtained by leaching ores, which have been subjected to a chloridizing roasting process; these acid solutions were for example treated with sulfur-containing gases of coke ovens, in order to precipitate first the copper and then from the neutralized solutions the zinc. The practical application of this method has however been impossible, as it has many disadvantages; thus for example the treatment of the acid solutions and the precipitates is very difficult.

These disadvantages are avoided by the present invention which consists in precipitating the copper from the solutions by cementation with iron and then treating the iron-containing solutions free from copper and sulfates with sulfur-containing coke oven gases or the like, in order to precipitate the zinc. From the waste solutions free from zinc the iron may be recovered.

One method of practicing the invention is illustrated in the accompanying drawing by means of a schematic flow sheet.

The solutions obtained by leaching chloridizing roasted ores for example pyrites, which contain copper, zinc and Glauber's salt, are first freed from copper and from noble metals if present by cementation with iron according to the usual methods. From this solution, which is free from copper, the greatest part of Glauber's salt is removed by freezing the solution; the other sulfates still present are then preferably removed for example by treating the solution with calcium chloride in precipitating tank 1. The remaining solution, which is free from copper and sulfates and contains zinc and iron, which may be collected in a tank 2, is then treated with gases containing hydrogen sulfide, especially coke oven gases, in presence of substances neutralizing the liberating acid in order to precipitate the zinc as sulfide.

This treatment is advantageously carried out in towers 3, the solution being circulated from the collecting tanks 4 to the top of the towers by means of pumps 5.

The treatment of the solution with gases is preferably effected under working conditions providing for large contact surfaces between the gases and the solutions. This is for example the case when working according to the counter current principle in washing towers; to the acid solutions entering the towers corresponding amounts of neutralizing agents, for example milk of lime, have to be added. One may however also use washing drums or the so-called Ströder-washers. The addition of the neutralizing agent to the solution, from which acid is liberated during the precipitation of the zinc sulfide, is preferably regulated in such a manner, that a neutral or weakly acid reaction is always maintained. Then the zinc is quantitatively converted into zinc sulfide, without precipitating at the same time the iron, originating from the cementation.

The liquor containing precipitated zinc sulfide may be collected in a tank 6 from which it passes through a filter press 7 to a precipitating tank 8.

The solution free from zinc may then be treated with milk of lime and oxidizing substances such as air in order to recover the iron. The iron precipitate is preferably converted into colcothar (English red).

The calcium chloride solution remaining after the precipitation of the iron and which may be collected in tank 9 is preferably used again in the process for precipitating the sulfates from the solutions, after they are freed from copper and the greatest part of Glauber's salt. The calcium sulfate obtained by this calcium chloride treatment is free from anhydride and may therefore be used for many purposes for example in the manufacture of cement.

The new method has the advantage, that all the valuable components of the leaching solutions namely copper, zinc, Glauber's salt are recovered with practically quantitative yields. The iron introduced into the process is also recovered as valuable by-product, such as colcothar, and furthermore gypsum of good qualities is obtained. The coke oven gases introduced into the process are freed from sulfur and thereby made more valuable. If the recovery of the iron introduced into the process is not desired, the iron containing solution freed from zinc may be used for removing the sulfates from fresh solutions used in the process.

According to another method for carrying out the invention the solution, freed from copper and the greater part of Glauber's salt for example by freezing, and containing iron and zinc is directly treated with hydrogen sulfide-containing gases in order to precipitate the zinc as zinc sulfide. Then the removal of the remaining sulfates by treating the solutions with calcium chloride solution is avoided, thereby avoiding the dilution and increase in volume of the zinc containing solutions.

It has also been found to be of advantage if the roasted ores are fractionally leached, in order to obtain solutions rich in zinc and poor in copper, which are then worked up according to the invention. Thus for example it is possible to leach the roasted ores in such a manner, that the first fraction, being for example 25 to 30% of the whole leaching solution, if separately collected, contains about 90% and more of the zinc present besides a small amount of copper and comparatively few $SO_4$-ions.

In the following claims the term "gases containing hydrogen sulfide" is intended to comprise gases, such as coke oven gases, in which hydrogen sulfide is present as a relatively minor constituent of the gas.

I claim:

1. A process for working up solutions obtained by leaching ores which have been subjected to a chloridizing roast which comprises precipitating the copper therefrom by cementation with iron, removing sulfates therefrom, and precipitating zinc from the resulting solution by treatment with gases containing hydrogen sulfide.

2. A process for working up solutions obtained by leaching ores which have been subjected to a chloridizing roast which comprises precipitating the copper therefrom by cementation with iron, removing sulfates therefrom, precipitating zinc from the resulting solution by treatment with gases containing hydrogen sulfide, and recovering the iron from the zinc-free solutions.

3. A process for working up solutions obtained by leaching ores which have been subjected to a chloridizing roast which comprises precipitating the copper therefrom by cementation with iron, removing sulfates therefrom, precipitating zinc from the resulting solution by treatment with gases containing hydrogen sulfide, and treating the zinc-free solutions with milk of lime and oxidizing agents to precipitate the iron.

4. A process for working up solutions obtained by leaching ores which have been subjected to a chloridizing roast which comprises precipitating the copper therefrom by cementation with iron, removing sulfates therefrom by freezing out Glauber's salt, and precipitating zinc from the resulting solution by treatment with gases containing hydrogen sulfide.

5. A process for working up solutions obtained by leaching ores which have been subjected to a chloridizing roast which comprises precipitating the copper therefrom by cementation with iron, removing sulfates therefrom, and precipitating zinc from the resulting solution by treatment with gases containing hydrogen sulfide with the addition of a neutralizing lime compound and using the solutions thus obtained to remove sulfates from fresh leaching solutions after they have been freed from copper.

6. A process for working up solutions obtained by leaching ores which have been subjected to a chloridizing roast which comprises precipitating the copper therefrom by cementation with iron, removing a part of the sulfates therefrom, and precipitating zinc from the resulting solution by treatment with gases containing hydrogen sulfide.

7. A process for working up solutions obtained by leaching ores which have been subjected to a chloridizing roast which comprises precipitating the copper therefrom by cementation with iron, removing sulfates therefrom by freezing, and precipitating zinc from the resulting solution by treatment with gases containing hydrogen sulfide.

8. A process for working up solutions obtained by leaching ores which have been subjected to a chloridizing roast which comprises separately collecting the first zinc-rich fractions of the leaching solution, precipitating the copper therefrom by cementation with iron, removing sulfates therefrom, and precipitating zinc from the resulting solution by treatment with gases containing hydrogen sulfide.

In testimony whereof I affix my signature.

HANS NEUMARK.